Nov. 4, 1958 F. W. SALLWEY 2,858,743
COPYING MACHINE-TOOL, IN PARTICULAR MILLING MACHINE
Filed May 24, 1955

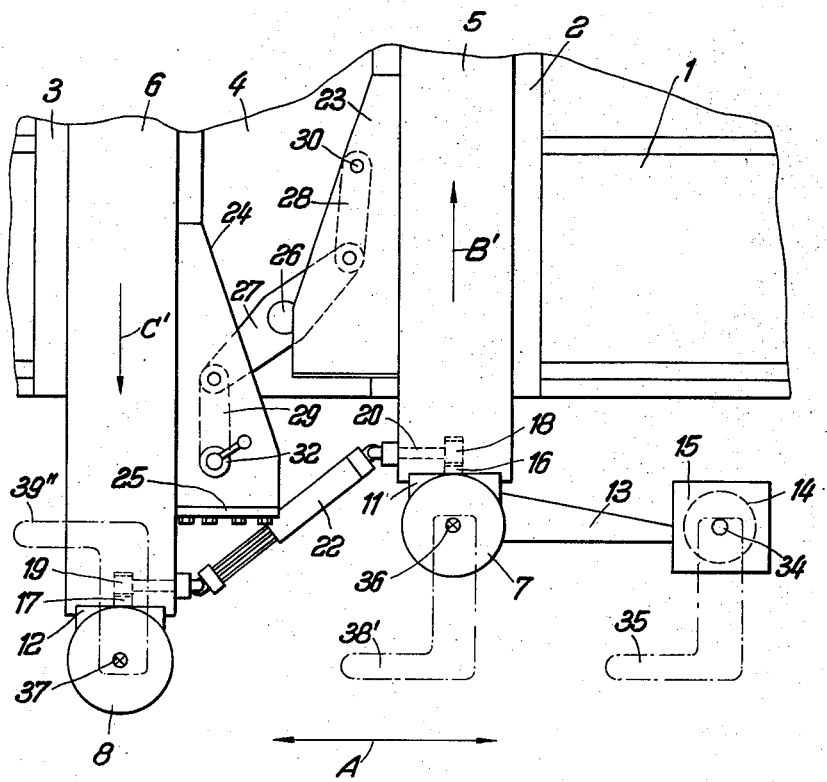

United States Patent Office 2,858,743
Patented Nov. 4, 1958

2,858,743

COPYING MACHINE-TOOL, IN PARTICULAR MILLING MACHINE

Friedrich W. Sallwey, Langen, near Frankfurt am Main, Germany, assignor to Nassovia Maschinenfabrik Hanns Fickert G. m. b. H., Langen, near Frankfurt am Main, Germany Application May 24, 1955, Serial No. 510,715

Claims priority, application Germany June 1, 1954

2 Claims. (Cl. 90—13.1)

The invention relates to copying machine-tools, particularly milling machines, and comprises an arrangement by means of which several milling heads may be made to execute advances in like or opposed directions to each other.

The use of copying milling machines for making either a geometrically similar or a mirror-image copy from a prototype, for example a pattern or template, is known.

The object of the invention is so to equip a copying machine-tool, in particular a milling machine, preferably for three-dimensional copying, that it will be possible, in one copying operation, simultaneously to produce one or more similar or similar and symmetrical parts from one prototype. This problem is solved, according to the invention, by equipping a copying milling machine, for example, with two milling heads, and by so arranging and interconnecting the carriages bearing the milling heads and the tracing head that the two milling heads can execute motions in the same direction as the tracing head, or one of them in the same direction and the other mirror-image-wise.

The device according to the invention will now be more fully described with reference to the accompanying drawings, but it should be understood that these are given by way of illustration and not of limitation and that many changes in the details may be made without departing from the spirit of the invention.

In the drawings,

Fig. 3 shows a top view of the machine according to Fig. 1, set up for making one identical and one mirror-image copy.

Figure 1:
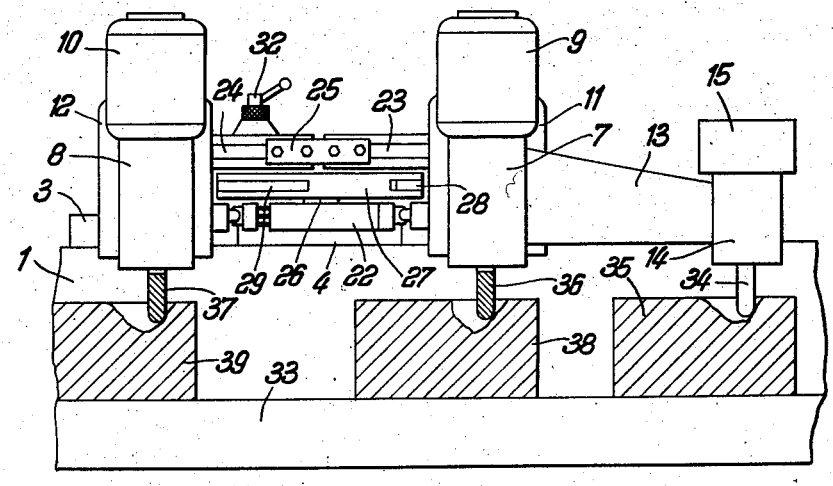
Fig. 1 shows a schematic front view of a preferred embodiment of a copying milling machine according to the invention.

On the frame 1 of the copying milling machine, two cross-carriages 2 and 3 are displaceably mounted in conventional manner, being joined in a rigid configuration by means of a connecting part 4. These cross-carriages respectively bear transverse carriages 5 and 6, equipped with vertical carriages 11 and 12 bearing milling heads 7 and 8 and corresponding drive motors 9 and 10. One of the milling heads, for example 7, is connected by an arm 13 to tracer head 14 with tracing mechanism 15. The tracing mechanism 15 controls the drive means of the joined cross-carriages 2, 3, transverse carriage 5 and vertical carriage 11 for purposes of copying in known manner.

The tracing means and carriage drives not pertaining to the subject matter of the invention, they have been omitted from the drawing for greater simplicity, and will not be described.

The back of each of the vertical carriages 11 and 12 is provided with a vertical rack 16, 17 in engagement with a matching stationary but rotatably mounted pinion 18, 19 on the corresponding transverse carriage 5, 6. The shafts 20 and 21 of the two pinions are connected by a longitudinally adjustable articulated shaft 22. The transverse carriages 5 and 6 are provided with opposed horizontal projections 23 and 24 which may be rigidly joined together by a locking means 25, for example a tie-plate.

On the part 4 joining the two cross-carriages 2 and 3, underneath the projections 23, 24 issuing from transverse carriages 5, 6, a two-ended lever 27 is rotatably mounted in horizontal position upon a vertical pivot 26. Each end of this lever is connected to a link 28, 29, link 28 being pivoted to a fixed point 30 on projection 23. Link 29, near its free end, with a vertical threaded hole 31, engageable by a locking means 32, for example a rotatable threaded bolt, thereby movably connecting link 29 to projection 24 of transverse carriage 6.

The mode of operation of the machine will now be described consecutively in terms of two machining operations.

Figure 2:
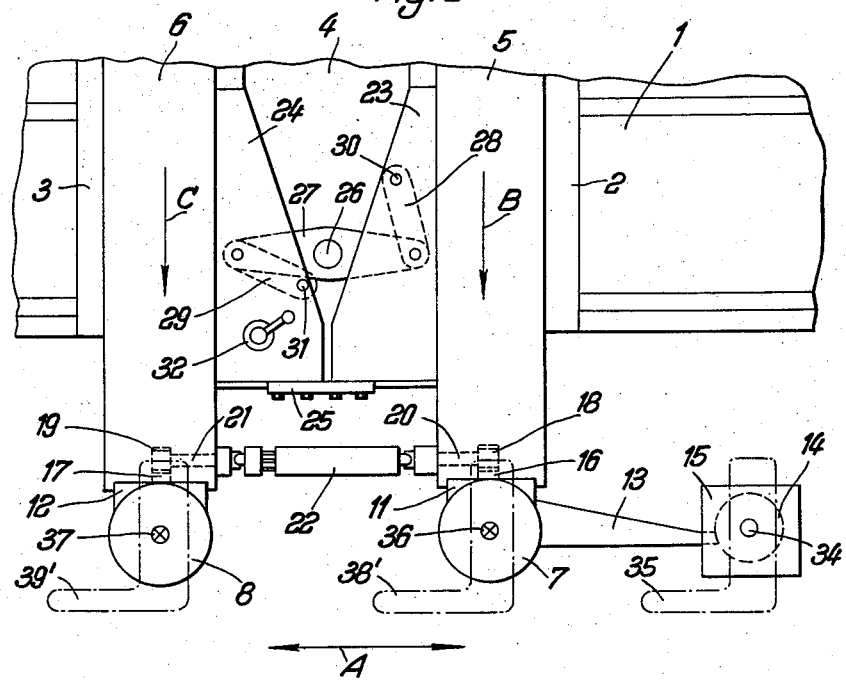
Fig. 2 shows a top view of the machine according to Fig. 1, set up for making identical copies.

A. *Production of two identical copies* (Figs. 1 and 2).—
On the bed 33 of the machine, the pattern 35 is set up in the field of the tracer 34, and parts 38 and 39 in the fields of the two cutters 36 and 37, in the usual manner. Lock 32 and link 29 are detached, placing the lever mechanism 27, 28, 29 out of service. The lock 25 rigidly connecting the two cross-carriages 5 and 6 is closed. Now if the machine is driven for copying purposes by any otherwise-known control and drive means, the tracing motion being in the direction of arrow A (Fig. 2), and the advance of milling head 7 and hence tracing head 14 in the direction of arrow B, then both the tracer 34 and the two cutters 36, 37 will move in like directions. The advance of cutter 37 will occur simultaneously in the direction of arrow C, being directed the same as that of cutter 36 and tracer 34 (arrow B). The vertical motions of carriage 11 are transmitted via rack 16, pinion 18, articulated shaft 22, pinion 19 and rack 17, to vertical carriage 12, simultaneously and in like direction. Thus copies 38' and 39' identical with the pattern 35 are made out of parts 38, 39.

The tracing means and advance may alternatively, without departing from the spirit of the invention, be such that tracing occurs in the direction of motion of transverse carriages 5 and 6, and the advance in the direction of motion of cross-carriages 2 and 3.

B. *Production of one identical and one mirror-image copy* (Figs. 1 and 3).—The machine is equipped as described under "A." However, lock 25 is to be open and lock 32 connected to link 29. When the machine is operated for copying as in Fig. 2, cutter 36 executes motions in like direction with tracer 34 in all three principal planes of the three-dimensional rectangular coordinate system, while cutter 37, through action of lever 27, executes a motion opposite to cutter 36; that is, in the advance designated by arrows B' and C', the two cutters execute opposite motions, while in the direction of exploration designated by arrow A at 90° to the aforesaid, as well as vertically, the two cutters execute motions in like direction. As a result, a copy 38' identical with pattern 35 and a mirror-image copy 39" are milled out of parts 38 and 39.

What I claim is:

1. A copying machine tool, in particular a multi-spindle milling machine for three-dimensional copying comprising in combination, a support; a pair of parallel spaced lateral cross-carriages movably mounted on said support; first and second lateral parallel spaced sliding carriages transversely mounted on said first pair of cross-carriages, each of said transverse carriages provided with a lateral projection directed towards the other carriage; first and second vertically slidable carriages, each of said carriages mounted on one said first and second transverse carriages respectively and provided with a rack; a shaft rotatably mounted on each of the said transverse carriages; a pinion secured to each of said shafts and meshing with its respective rack in the said vertical carriages; a shaft connecting the said shafts; first and second milling heads secured to said first and second vertically slidable carriages respectively; a tracer head secured to said first milling head; a double-armed lateral lever having opposed ends, one of said ends operatively connected with the projection of the first of said transverse carriages, the other of said ends adapted for attachment to the projection of said second carriage, locking means for attaching said other end of the lever with an adjacent projection of said second carriage, whereby when said other lever end is attached to said projection an identical and a mirror-like copy of an original may be produced.

2. A copying machine tool, in particular a multi-spindle milling machine for three-dimensional copying comprising in combination, a support; first and second parallel spaced lateral cross-carriages movably mounted on said support; a pair of lateral parallel spaced sliding carriages transversely mounted on said first pair of cross-carriages, each of said transverse carriages provided with a lateral projection directed towards the other carriage; first and second vertically slidable carriages, each of said carriages mounted on one of said first and second transverse carriages respectively and provided with a rack; a shaft rotatably mounted on each of the said transverse carriages; a pinion secured to each of said shafts and meshing with its respective rack in the said vertical carriages; a shaft connecting the said shafts; first and second milling heads secured to said first and second vertically slidable carriages respectively; a double-armed lateral lever having opposed ends, one of said ends operatively connected with an adjacent projection of said first transverse carriage, the other of said ends being detached from an adjacent projection of said second transverse carriage, whereby when said other lever end is detached from said projection, only a copy identical with the original may be made.

References Cited in the file of this patent

UNITED STATES PATENTS

| 2,185,011 | Anderson | Dec. 26, 1939 |
| 2,718,702 | Glass | Sept. 27, 1955 |

FOREIGN PATENTS

| 207,604 | Germany | Mar. 4, 1909 |
| 277,758 | Switzerland | Jan. 16, 1952 |